United States Patent
Yeo

[11] Patent Number: 5,159,174
[45] Date of Patent: Oct. 27, 1992

[54] NONCONSUMABLE ELECTRODE FOR STAINLESS STEEL WELDING AND METHOD OF WELDING

[75] Inventor: Denis Yeo, Columbia, S.C.

[73] Assignee: Westinghouse Electric Corp., Pittsburgh, Pa.

[21] Appl. No.: 607,924

[22] Filed: Nov. 1, 1990

[51] Int. Cl.$^5$ .............................................. B23K 35/22
[52] U.S. Cl. .................................. 219/137 R; 219/75
[58] Field of Search ................ 219/137 R, 145.21, 75, 219/76.15

[56] References Cited

U.S. PATENT DOCUMENTS

| | | | |
|---|---|---|---|
| 3,198,932 | 8/1965 | Weatherly | 219/145.21 |
| 3,876,855 | 4/1975 | Hirasawa et al. | |
| 3,976,853 | 8/1976 | Trattner et al. | |
| 4,001,461 | 1/1977 | Bykhovsky | 219/76.15 |
| 4,075,454 | 2/1978 | Duncan et al. | 219/137 R |
| 4,678,718 | 7/1987 | Wang | |

FOREIGN PATENT DOCUMENTS

| | | |
|---|---|---|
| 1942632 | 8/1969 | Fed. Rep. of Germany |
| 2755213 | 12/1977 | Fed. Rep. of Germany |
| 50-154138 | 6/1974 | Japan |

*Primary Examiner*—Clifford C. Shaw

[57] ABSTRACT

A method of welding stainless steel, such as a stainless steel end plug into a stainless steel nuclear fuel rod is disclosed. The welding process has a reduced arc wander and deeper arc penetration. A treated welding electrode for practicing the method also is disclosed. A layer of stainless steel is placed on the working arc discharge end of a nonconsumable tungsten arc welding electrode before welding. The stainless steel coating on the electrode reduces arc wander and permits deeper arc penetration. Approximately 0.001 to 0.005 inches of stainless steel is placed on the working arc discharge end of the electrode. The electrode coating can be formed by positioning the working arc discharge end of the electrode into close proximity to a grounded piece of stainless steel and then electrically shorting the electrode to the stainless steel so that the working arc discharge end sticks to the stainless steel. The working arc discharge end of the electrode is broken from the stainless steel so that a layer of stainless steel remains thereon.

23 Claims, 2 Drawing Sheets

NONCONSUMABLE ELECTRODE FOR STAINLESS STEEL WELDING AND METHOD OF WELDING

FIELD OF THE INVENTION

This invention relates to an electrode and a method for welding stainless steel. In addition, the invention relates to the method of treating the working arc discharge end of a nonconsumable arc welding electrode for use in stainless steel welding.

BACKGROUND OF THE INVENTION

Nonconsumable electrodes often are used for welding together stainless steel objects. For example, in the manufacture of stainless steel nuclear fuel rods, a stainless steel end plug is welded into one end opening of a stainless steel hollow tube. Fuel pellets are inserted through the open end of the tube which later is sealed with a second end plug. The end plug is welded to the tube by inert gas welding where an arc generated by a nonconsumable electrode and protected by a shielded atmosphere welds the joint to be formed. One welding process commonly used is TIG (tungsten inert gas) arc welding.

Often, the end plug and hollow tube have a mismatched sulfur content which causes arc wander ("blow") to occur in the direction of the stainless steel component having low sulfur. For example, if the end plug contains 30 ppm of sulfur, and the hollow tube contains 100 ppm sulfur, the arc generated by the electrode will deflect toward the end plug, creating a weld profile having a low depth to width ratio. This results in a weaker fuel rod which may fail during operation.

Various proposals have been made for the improvement of tungsten electrodes, in general. For example, prior art tungsten electrodes have been treated for increasing electron emission and aiding in heat transfer. Examples of such prior art electrodes include German patents 1942632 and 2755213 which include the addition of a coating or the formation of a suitable electrode matrix of an oxide such as Lanthanum Oxide or Thorium Dioxide. Likewise, U.S. Pat. No. 3,976,853 to Trattner, et al., discloses an improvement in the ignitibility of a thoriated tungsten electrode by fuse sintering into a bore of the electrode a mass of electron emission increasing metal-nonmetal compounds. Despite the attention which has been given to improving tungsten electrodes, the arc wander problem has not been satisfactorily resolved.

SUMMARY OF THE INVENTION

It is therefore an object of this invention to provide a method of welding stainless steel having a reduced arc wander and deeper arc penetration.

It is another object of this invention to provide a method of treating the working arc discharge end of a nonconsumable arc welding electrode used in welding together stainless steel objects, such as an end plug into a hollow nuclear fuel rod, wherein the welding process has a reduced arc wander and deeper arc penetration.

It is still another object of this invention to provide an electrode for arc welding of stainless steel having a reduced arc wander and deeper arc penetration when welding stainless steel objects having mismatched sulfur content.

These and other objects of the present invention are accomplished by an electrode for arc welding of stainless steel which comprises a solid, noncomsumable rod of metallic material which is adapted to readily emit electrons upon an electric potential being applied thereto. The electrode includes a working arc discharge end and a layer of stainless steel is positioned on the working arc discharge end of the electrode. Advantageously, the electrode includes a substantially planar end portion and the layer of stainless steel is deposited on the substantially planar end portion. Preferably, the stainless steel coating ranges from about 0.001 to about 0.005 inches 0.00254 to 0.0127 cm) in thickness. The nonconsumable electrode preferably is formed from a material comprising tungsten.

The improved arc welding electrode is provided according to another aspect of the invention by depositing stainless steel on the working arc discharge end of a conventional inert gas welding electrode. The stainless steel can be deposited on the working arc discharge end of the electrode in one preferred method of the invention by positioning the working arc discharge end of the electrode in close proximity to a grounded piece of stainless steel. The electrode is electrically shorted to the stainless steel and the working arc discharge end sticks to the stainless steel. The working arc discharge end of the electrode is broken away from the stainless steel so that a layer of stainless steel remains on the discharge end.

BRIEF DESCRIPTION OF THE DRAWINGS

Some of the objects and advantages of the present invention having been stated, others will become apparent by reference to, the following drawings, in which.

DETAILED DESCRIPTION OF THE PREFERRED EMBODIMENT

Figure 1:
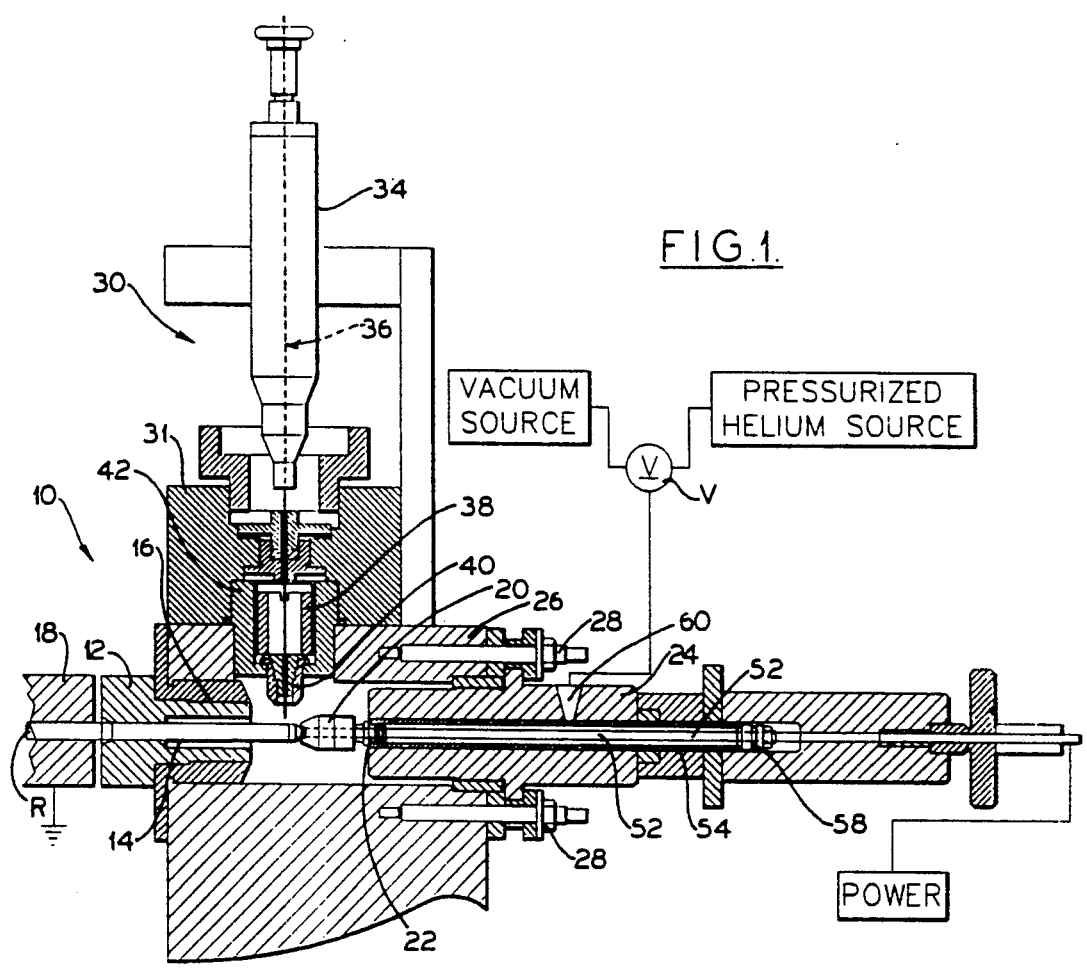
FIG. 1 is a partial, side sectional view of a welding chamber used for welding a stainless steel end plug into a stainless steel nuclear fuel rod in accordance with the present invention.

Referring to the drawings, and more particularly to FIG. 1, there is shown a conventional welding chamber for girth and seal welding a stainless steel end plug coaxially into the end of a stainless steel nuclear fuel rod. Although the welding electrode and method of the present invention is applicable to a wide variety of welding chambers and stainless steel objects to be welded, the present invention will be discussed in relation to the stainless steel welding of an end plug coaxially positioned in a nuclear fuel rod.

As indicated previously, the welding of a stainless steel end plug into a stainless steel nuclear fuel rod can involve the end plug and the nuclear fuel rod having mismatched sulfur contents. As is well known in the art, conventional TIG welding of stainless steel objects having mismatched sulfur content results in arc wander toward the stainless steel object having the lower sulfur content. Thus, a low depth to width profile is obtained resulting in a faulty joint. The method and electrode of this invention can minimize or eliminate the above problem and can be used in the stainless steel welding of any number of objects having mismatched sulfur contents thus improving the practicality of TIG welding of stainless steels having mismatched sulfur contents.

The method and invention has been found workable with austenitic Stainless Steel AISI No. 304 and 308 stainless steel having a sulfur content as high as 0.030 percent. Other examples of the types of stainless steel especially workable with the present invention include AISI Nos. 201, 202, 301, 302, 302B, 304L, 305, 309, 309S, 310, 310S, 314, 316, 316L, 317, 321, 347, 348, 403, 405, 410, 414, 420, 429, 430, 431, 434, 440A, 440B, 440C, 442, 446, 501 and 502. It is believed that the method and electrode of the present invention is applicable for use with all different types of austenitic, martensitic and ferritic stainless steels which often contain nominal amounts of sulfur and thus suffer some degree of arc wander resulting from mismatched sulfur contents.

Referring now to FIG. 1, the welding chamber, indicated generally at 10, includes a fuel rod receiving head 12 having an orifice 14 therethrough to receive a tubular nuclear fuel rod R. The receiving head 12 is secured by a press fit into a Welding chamber access opening 16. The fuel rod R, held by a grounded chuck 18, is advanced through the receiving head so that the end plug P engages an end stop 20. The chuck 18 is rotatable by drive means (not shown). The end stop 20 is rotatably mounted by a frictionless bearing 22 to an end stop support column 24 which is bolted to the welding chamber housing 26 by means of bolts and spacer bushings 28, to allow unimpeded rotation of the fuel rod R during girth welding. The end stop 20 is described more fully in U.S. Pat. application Ser. No. 373,076, filed Jun. 29, 1989 by Robert Duncan which is incorporated herein by reference.

The welding chamber 10 includes a conventional girth welding assembly indicated generally at 30, and is supported by a coupler 31 fixed to the welding chamber housing 26 and extending radially into the welding chamber 10. The girth welding assembly 30 is a conventional TIG welder and includes a power generator 34 having a nonconsumable tungsten electrode, indicated generally at 36, and a welding nozzle 38 for mixing an inert gas with the arc produced by the power generator 34. The welding nozzle 38 terminates in a tip 40 through which the tungsten electrode extends. A housing member 42 supports the welding nozzle 38 and tip. The tungsten electrode 36 extends the length of the power generator 34 and extends through the nozzle tip 40. Positioning clamp means in the nozzle (not shown) clamps the electrode in a set position relative to the nozzle.

As is conventional with tungsten inert gas arc welding, an arc is generated between the tungsten electrode and the joint to be formed. The preferred inert gas is helium and is provided into the welding chamber by a gas supply (not shown). The inert gas envelope contained in the welding chamber surrounds the generated arc and tungsten electrode and prevents decomposition of the tungsten electrode.

As known to the skilled artisan, the tungsten electrode is not a filler-metal electrode and is not deposited in the weld. Inert gas welding tungsten electrodes are well known to those skilled in the art and are formed of a matrix material which consists primarily of tungsten and can also include Thorium Dioxide and/or have a coating of Lanthanum Oxide. The generated arc contacts the area of the joint to be formed and melts that area, resulting, when the metal is cool, in an acceptable weld. This type of nonconsumable electrode is different from consumable electrodes which are deposited in the weld, such as E308-15 commonly used in stainless steel welding with reverse polarity current. In the present invention, an AC power source (not shown) is preferred and is stabilized in the power generator by means conventional to the industry. Although tungsten is preferred for the electrode, this invention is considered to be applicable to other nonconsumable electrode materials which exhibit properties similar to tungsten.

Figure 4:
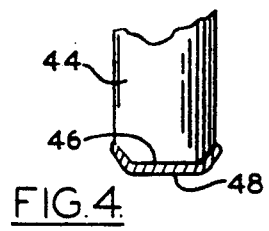
FIG. 4 is an enlarged view of the working arc discharge end of the nonconsumable electrode and showing in section a stainless steel coating thereon.

The tungsten electrode 36 of a preferred construction in accordance with the present invention, includes a working arc discharge end 44 having a substantially flat, planar end portion 46 (FIGS. 2 and 4) which extends through the nozzle tip 40. The position of the working arc discharge end 44 can be changed by clamping the electrode in a new position or moving the power generator 34 relative to the housing 26. The tungsten electrode 36 is adapted to readily emit electrons upon an electric potential being applied thereto. The tungsten electrode 36 used in the welding chamber 10 is approximately 0.0300 to 0.0625 inches in diameter. In accordance with the present invention, the working arc discharge end 44 of the nonconsumable electrode includes a stainless steel coating 48 deposited thereon. The coating ranges from 0.001 to 0.005 inches (0.0025 to 0.0127 cm) in thickness and is located on the substantially planar end portion 46 (FIG. 4). As will be explained in detail later, the stainless steel coating 48 reduces arc wander and allows deeper arc penetration during stainless steel welding of those objects having mismatched sulfur content.

Although not wishing to be bound by theory, it is believed that minute amounts of sulfur in the stainless steel coating provided according to this invention can aid in reducing the arc wander existing when stainless steel objects having mismatched sulfur content are welded. Therefore, it is believed desirable that the stainless steel coating include some nominal amount of sulfur and thus, the coating is preferably formed from a stainless steel of the type listed previously.

The end stop 20 includes a front end configured to engage the end of the fuel rod end plug in a vacuum tight seal. As is conventional, the end plug P includes an axial opening 50 (FIGS. 6 & 7) communicating with the interior of the fuel rod. When the end plug P is engaged with the end stop 20 the opening 50 communicates with an axial passage extending through the end stop 20. The end stop 20 includes a rearwardly extending gas passage tube 52 mounted in a support tube 54 which is disposed axially in the end stop support column 24. The gas passage tube 52 is mounted by conventional ball thrust bearing and radial ball bearings 58 which allow rotation of the end stop as described in the above-noted allowed patent application.

A gas passage nozzle 60 extends radially through the support column 24 and communicates into the gas passage tube 52. The nozzle 60 communicates through a conventional valve V to a vacuum source for creating a vacuum draw in the gas passage tube 52 and the end stop 20 for allowing evacuation of the fuel rod during girth welding. Additionally, the nozzle connects to a pressurized helium source for pressurizing the fuel rod before seal welding. A vacuum is drawn to sufficiently reduce the pressure and the available oxygen within the fuel rod to minimize oxidation during girth welding.

Referring now to FIGS. 2-5, there is illustrated one preferred manual method of placing the stainless steel coating 48 on the working arc discharge end 44 of the electrode. Other methods can include plasma spray, sputtering, dipping and the other metal deposition methods conventionally used in the industry.

Figure 2:
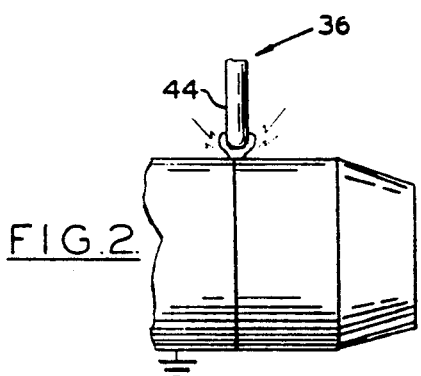
FIG. 2 is a side elevational view showing a nonconsumable electrode being shorted to the joint to be formed between a stainless steel end plug and a stainless steel nuclear fuel rod.
Figure 3:
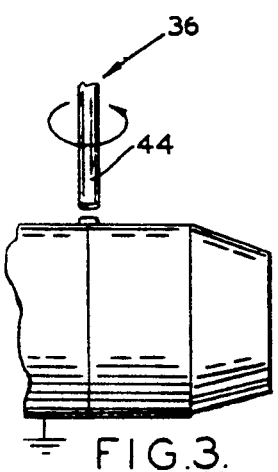
FIG. 3 is a side elevational view of the nonconsumable electrode being broken from the joint to be formed between the stainless steel end plug and nuclear fuel rod.

In the preferred manual method, a scrap fuel rod and end plug are inserted within the welding chamber 10 and placed against the end stop 20. The electrode working arc discharge end is brought into contact with the scrap rod and then backed away from the joint approximately 0.001 to 0.003 inches (0.0025 to 0.0076 cm). The power generator 34 is activated and an arc is discharged from the tungsten electrode. The close distance between the working arc discharge end of the electrode and the grounded fuel rod R causes the electrode to short and stick to the fuel rod (FIG. 2). An operator manually grasps the upper end of the electrode and twists the electrode to break the electrode from the joint to be formed (FIG. 3). As the electrode breaks from the stainless steel fuel rod, a stainless steel deposit ranging typically from 0.001 to 0.005 inches in thickness remains on the working arc discharge end of the electrode. Alternatively, the manual method of the invention can be accomplished using an acceptable fuel rod, in which case the acceptable fuel rod can be positioned in the welding chamber 10 and the electrode shorted thereto. This is not preferred because the fuel rod R may be damaged.

Figure 5:
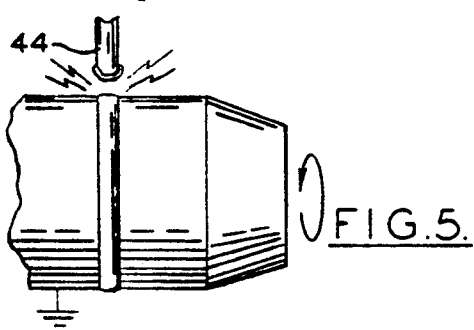
FIG. 5 is a side elevational view which illustrates welding of the stainless steel end plug into the stainless steel nuclear fuel rod with the treated electrode in accordance with the present invention.

Thereupon, the electrode can be used in the nuclear fuel welding process by replacing the scrap fuel rod with an acceptable fuel rod and end plug to be welded. The working arc discharge end 44 of the electrode 36 is positioned to within 0.015 to 0.020 inches (0.0381 to 0.051 cm) of the joint to be formed. Upon the application of an electric potential, an arc is generated between the electrode and the joint J to be formed. The arc is directed against the joint for welding, and because the welding is conducted using the electrode of this invention, significant arc wandering from the joint is prevented and a deeper arc penetration is obtained. During girth welding, the rod R is rotated in the chuck 18 by drive means (not shown) and a complete girth weld around the fuel rod is obtained (FIG. 5).

The stainless steel coating 48 is retained on the discharge end of the electrode during numerous welding operations.

Figure 6:
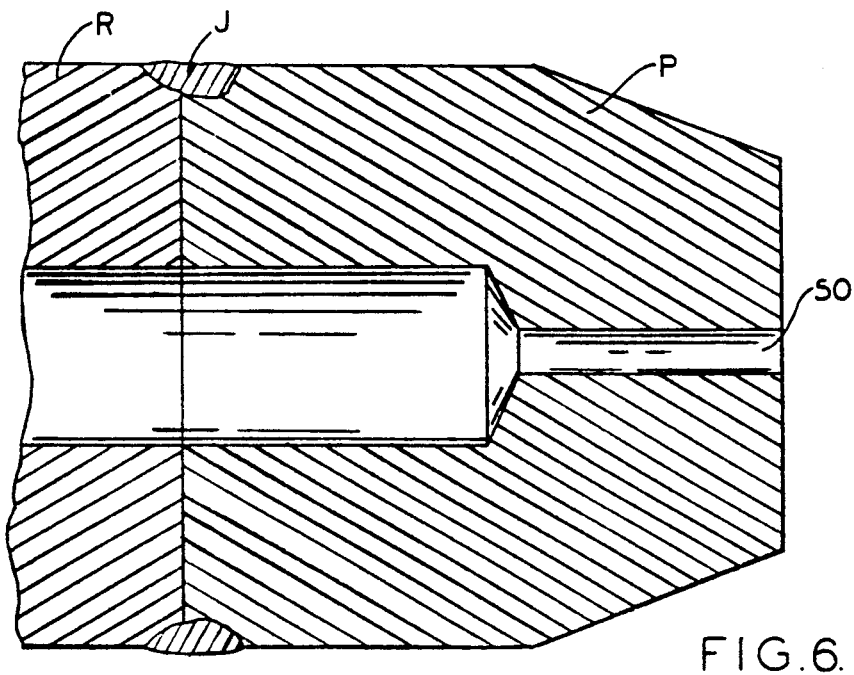
FIG. 6 is an enlarged sectional view illustrating a stainless steel end plug welded into a stainless steel nuclear fuel rod by an untreated nonconsumable electrode and showing a weld with an unacceptable weld depth to width ratio.
Figure 7:
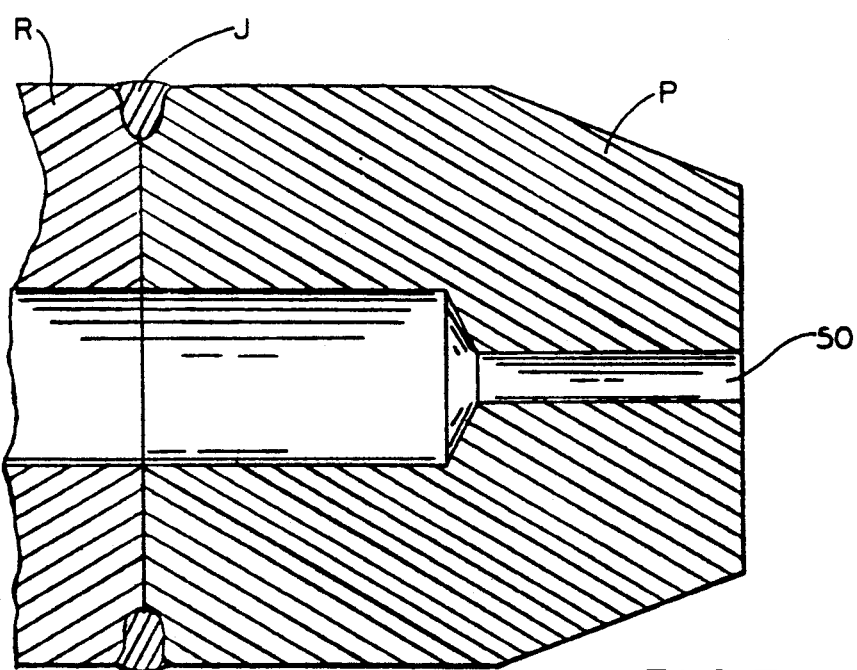
FIG. 7 is an enlarged sectional view illustrating a stainless steel end plug welded into a stainless steel nuclear fuel rod by a treated nonconsumable electrode in accordance with the present invention and showing an acceptable weld depth to width ratio.

FIG. 6 shows an accurate illustration of a weld formed between a stainless steel end plug P and a stainless steel nuclear fuel rod R having mismatched sulfur contents where arc wander toward the end plug occurred. As illustrated, the weld is spread across the joint J and much of the weld penetration is directed against the end plug P and not the joint J. An untreated tungsten electrode was used. FIG. 7 illustrates welding with a treated electrode in accordance with the present invention of a stainless steel end plug and stainless steel nuclear fuel rod having mismatched sulfur content where arc wander during welding was reduced and an acceptable depth to width ratio was obtained at the interface between the end plug and nuclear fuel rod. A tungsten electrode of this invention having a stainless steel coating was used in welding the joint of FIG. 7.

The tungsten electrode of the present invention is especially suited for critical tolerance stainless steel welding where the objects to be welded may have mismatched sulfur content. This often is the case when welding austenitic and other similar types of stainless steel objects such as a stainless steel end plug and a stainless steel nuclear fuel rod. Because small amounts of arc wander occurs when a conventional tungsten electrode is used to weld stainless steel objects having a mismatched sulfur content, this can create a weak weld (FIG. 6). The present invention minimizes or eliminates the arc wander problem and maintains a high quality weld.

In the drawings and specification, there has been set forth a preferred embodiment of the invention, and even though specific terms are employed, they are used in a generic and descriptive sense only and not for purposes of limitation.

I claim:

1. A method of treating the working arc discharge end of a nonconsumable arc welding electrode used in welding stainless steel to provide an electrode for use in a welding process having a reduced arc wander and deeper arc penetration, comprising applying a layer of stainless steel to the working arc discharge end of the nonconsumable arc welding electrode before welding thereof.

2. The method according to claim 1 wherein the step of applying a layer of stainless steel to the working arc discharge end of the nonconsumable electrode includes the steps of positioning the working arc discharge end of the electrode in close proximity to a grounded piece of stainless steel, electrically shorting the electrode to the stainless steel so that the working arc discharge end sticks to the stainless steel, and breaking the working arc discharge end of the electrode from the stainless steel so that a layer of stainless steel remains on the working arc discharge end of the electrode.

3. The method according to claim 2 wherein the working arc discharge end of the nonconsumable electrode is positioned to a location within about 0.001 to about 0.003 inches from the grounded stainless steel at the time the electrode is shorted.

4. The method according to claim 1 wherein the nonconsumable arc welding electrode is formed of a material comprising tungsten.

5. A method of welding stainless steel comprising the steps of:

positioning the working arc discharge end of a nonconsumable arc welding electrode layer of stainless steel on the working arc discharge end thereof to within a predetermined welding arc distance of the joint to be formed; and generating an arc between the electrode and the joint to be formed for welding whereby significant arc wandering from the joint is prevented and a deeper arc penetration is obtained.

6. The method according to claim 5 wherein the stainless steel coating positioned on the working arc discharge end of the electrode ranges from about 0.001 to about 0.005 inches in thickness.

7. The method according to claim 5 wherein the nonconsumable electrode is formed of a material comprising tungsten.

8. The method according to claim 5 wherein the welding occurs in an inert gas atmosphere.

9. A method of girth welding a stainless steel end plug into a stainless steel nuclear fuel rod comprising the steps of:
 positioning the working arc discharge end of a nonconsumable arc welding electrode which includes a layer of stainless steel on the working arc discharge end thereof to within a predetermined arc welding distance from the joint to be formed between the end plug and the nuclear fuel rod; and
 generating an arc between the electrode and the joint to be formed for welding while simultaneously rotating the fuel rod whereby significant arc wandering from the joint is prevented and a deeper arc penetration is obtained.

10. The method according to claim 9 wherein the stainless steel coating positioned on the arc discharge end of the electrode ranges from about 0.001 to about 0.005 inches in thickness.

11. The method according to claim 9 wherein the nonconsumable electrode is formed of tungsten.

12. The method according to claim 9 wherein welding occurs in an inert gas atmosphere.

13. The method according to claim 9 wherein the working arc discharge end of the electrode is positioned to within about 0.015 to about 0.020 inches of the joint to be formed during welding.

14. The method according to claim 9 wherein the electrode is between about 0.0300 and about 0.0625 inches in diameter.

15. A method of welding stainless steel comprising the steps of:
 positioning the working arc discharge end of a nonconsumable arc welding electrode into close proximity to a stainless steel joint to be formed;
 electrically shorting the electrode to the joint by generating an arc between the electrode and the joint to be formed so that the electrode sticks to the joint;
 breaking the electrode from the stainless steel so that a layer of stainless steel remains on the tip of the electrode;
 positioning the working arc discharge end of the electrode to within a predetermined arc welding distance from the joint to be formed; and
 generating an arc between the electrode and the joint to be formed wherein the arc is directed against the joint for welding whereby significant arc wandering from the joint is prevented and a deeper arc penetration is obtained.

16. The method according to claim 15 wherein the working arc discharge end of the nonconsumable electrode is advanced into contact against the joint to be formed and then retracted to within 0.001 to 0.003 of an inch before shorting the electrode to the joint.

17. The method according to claim 15 wherein the nonconsumable electrode is formed of a material comprising tungsten.

18. The method according to claim 15 wherein the stainless steel coating positioned on the working arc discharge end of the electrode ranges from 0.001 to 0.005 inches in thickness.

19. The method according to claim 15 wherein the welding occurs in an inert gas atmosphere.

20. An electrode for arc welding of stainless steel comprising a solid, nonconsumable rod of metallic material adapted to readily emit electrons upon an electrical potential being applied thereto, said electrode having a working arc discharge end, and including a layer of stainless steel on the working arc discharge end of the electrode.

21. The electrode according to claim 20 wherein said electrode includes a substantially planar end portion and wherein said layer of stainless steel is located on said planar end portion.

22. The electrode according to claim 20 wherein said stainless steel coating ranges from about 0.001 to about 0.005 inches in thickness.

23. The electrode according to claim 20 wherein said nonconsumable electrode is formed from a material comprising tungsten.

* * * * *